United States Patent
Al Bassam (10) Patent No.: US 12,270,735 B2
(45) Date of Patent: Apr. 8, 2025

(54) METHOD AND SYSTEM FOR MANAGING COMPONENT FAILURES AMONG AUTOMATION SYSTEMS

(71) Applicant: SAUDI ARABIAN OIL COMPANY, Dhahran (SA)

(72) Inventor: Adnan Hamad Al Bassam, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 407 days.

(21) Appl. No.: 16/996,193

(22) Filed: Aug. 18, 2020

(65) Prior Publication Data

US 2022/0057298 A1 Feb. 24, 2022

(51) Int. Cl.
*G01M 99/00* (2011.01)
*G05B 19/05* (2006.01)
*G06Q 10/087* (2023.01)

(52) U.S. Cl.
CPC .......... *G01M 99/005* (2013.01); *G05B 19/05* (2013.01); *G06Q 10/087* (2013.01); *G05B 2219/163* (2013.01)

(58) Field of Classification Search
CPC ... G01M 99/005; G05B 19/05; G05B 19/058; G05B 2219/163; G06Q 10/087; G06Q 10/20
See application file for complete search history.

(56) References Cited

U.S. PATENT DOCUMENTS

| 6,625,664 B2 * | 9/2003 | Gehring | G05B 19/0421 710/36 |
| 7,882,438 B2 * | 2/2011 | Markham | G06Q 10/10 700/109 |

(Continued)

FOREIGN PATENT DOCUMENTS

| CA | 2043890 C | 5/1998 |
| CN | 105160513 A | 12/2015 |
| WO | 2005122076 A2 | 12/2005 |

OTHER PUBLICATIONS

Encyclopædia Britannica. (n.d.). Automation. Britannica Academic. Retrieved Mar. 22, 2023, from https://academic.eb.com/levels/collegiate/article/automation/109393 (Year: 2023).*

(Continued)

*Primary Examiner* — Giovanni Astacio-Oquendo
*Assistant Examiner* — Martin Walter Braunlich
(74) *Attorney, Agent, or Firm* — Osha Bergman Watanabe & Burton LLP (57) ABSTRACT

A method may include obtaining, by a remote server, replacement data regarding various hardware components from various automation systems. The replacement data may describe component replacements of various component types that are used by the automation systems. The method may further include determining, by the remote server, a failure rate of a first component type using the replacement data. The first component type may be associated with an automation system. The method may further include determining, by the remote server, whether the failure rate of the first component type satisfies a predetermined replacement criterion. The method may further include transmitting, by the remote server and in response to determining that the failure rate of the first component type fails to satisfy the predetermined replacement criterion, a (Continued)

command to an automation system among the automation systems.

20 Claims, 6 Drawing Sheets (56) References Cited

U.S. PATENT DOCUMENTS

| | | | | |
|---|---|---|---|---|
| 8,433,596 | B2* | 4/2013 | Schierholt | G06Q 10/0631 |
| | | | | 705/28 |
| 9,959,515 | B2* | 5/2018 | Phan | G06Q 10/20 |
| 10,620,592 | B2* | 4/2020 | Sangi | F22B 35/18 |
| 10,860,012 | B2* | 12/2020 | Lee | G05B 23/00 |
| 11,194,321 | B2* | 12/2021 | Akula | G05B 23/0232 |
| 2006/0020485 | A1 | 1/2006 | Schierholt et al. | |
| 2010/0070331 | A1 | 3/2010 | Koegler et al. | |
| 2013/0297462 | A1 | 11/2013 | Ottley | |
| 2014/0336791 | A1* | 11/2014 | Asenjo | G05B 13/026 |
| | | | | 700/44 |
| 2015/0154535 | A1* | 6/2015 | Wappler | G06Q 10/087 |
| | | | | 705/28 |
| 2016/0224003 | A1* | 8/2016 | Buschmann | G06Q 50/04 |
| 2019/0304212 | A1* | 10/2019 | Bailey | G07C 5/0825 |
| 2020/0067789 | A1* | 2/2020 | Khuti | H04L 41/5009 |
| 2022/0026879 | A1* | 1/2022 | Kale | G06N 3/088 |

OTHER PUBLICATIONS

"Parts Management—Improved Inventory Management for Automation Systems", Honeywell, Honeywell International, Access Date: Aug. 17, 2020, URL: <https://www.honeywellprocess.com/en-US/explore/services/distributed-control-systems/hardware-support/Pages/parts-management.aspx> (1 page).

Rueff, Kevin, "No more trouble with outdated devices: The ABC of obsolescence management", Netilion Blog, Mar. 2019, URL: <https://netilion.endress.com/blog/obsolescence-management/amp/#aoh=15748040687667&referrer=https%3A%2F%2Fwww.google.com&_tf=From%20%251%24s> (5 pages).

Yali, Angela Lua et al., "Comprehensive Life Cycle Approach to Obsolescence Management", DSTA Horizons 2012, Defence Science and Technolgy Agency, 2012, URL: <https://www.dsta.gov.sg/docs/default-source/dsta-about/life-cycle-approach-to-obsolescence-management.pdf?sfvrsn=2>, pp. 18-27 (5 pages).

International Search Report issued in corresponding International Application No. PCT/US2020/049363, mailed Feb. 3, 2021 (3 pages).

Written Opinion issued in corresponding International Application No. PCT/US2020/049363, mailed Feb. 3, 2021 (6 pages).

* cited by examiner

METHOD AND SYSTEM FOR MANAGING COMPONENT FAILURES AMONG AUTOMATION SYSTEMS

BACKGROUND

During the life of an automation system, various high technology hardware components may require technical support and frequent upgrades as well as be prone to obsolescence. However, an automation system may continue to use obsolete hardware components where a sufficient quantity of spare components exist among third-party vendors. In particular, obsolete components may be used that are relatively stable. In contrast, some component types have a high failure rate, such that an automation system's consumption of spare parts for these component types may not be cost effective.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining, by a remote server, replacement data regarding various hardware components from various automation systems. The replacement data describe component replacements of various component types that are used by the automation systems. The method further includes determining, by the remote server, a failure rate of a first component type using the replacement data. The first component type is associated with an automation system among the automation systems. The method further includes determining, by the remote server, whether the failure rate of the first component type satisfies a predetermined replacement criterion. The method further includes transmitting, by the remote server and in response to determining that the failure rate of the first component type fails to satisfy the predetermined replacement criterion, a command to an automation system among the automation systems. The command causes the automation system to replace a hardware component corresponding to the first component type with a hardware component corresponding to a second component type. The first component type is different from the second component type.

In general, in one aspect, embodiments relate to a server that includes a processor and a memory coupled to the processor. The memory obtains, from a user device, various replacement requests regarding various hardware components from various automation systems. The memory further determines a failure rate of a first component type using the replacement requests. The first component type is associated with an automation system among the automation systems. The memory further determines whether the failure rate of the first component type satisfies a predetermined replacement criterion. The memory further transmits, in response to determining that the failure rate of the first component type fails to satisfy the predetermined replacement criterion, a command to an automation system among the automation systems. The command causes the automation system to replace a hardware component corresponding to the first component type with a hardware component corresponding to a second component type. The first component type is different from the second component type.

In general, in one aspect, embodiments relate to a non-transitory computer readable medium storing instructions executable by a computer processor. The instructions obtain replacement data regarding various hardware components from various automation systems. The replacement data describe component replacements for various component types that are used by the automation systems. The instructions further determine a failure rate of a first component type using the replacement data. The first component type is associated with an automation system among the automation systems. The instructions further determine whether the failure rate of the first component type satisfies a predetermined replacement criterion. The instructions further transmit, in response to determining that the failure rate of the first component type fails to satisfy the predetermined replacement criterion, a command to an automation system among the automation systems. The command causes the automation system to replace a hardware component corresponding to the first component type with a hardware component corresponding to a second component type. The first component type is different from the second component type.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for using a component supply manager to monitor replacement requests to determine failure rate data. After a hardware component malfunctions or otherwise becomes unusable, a replacement request may be transmitted to obtain a replacement component. Thus, a component supply manager may manage consumption of various hardware components by multiple automation systems through monitoring of such replacement requests. From this aggregation of replacement data, a component supply manager may indirectly determine failure rates of different component types, e.g., the frequency that a particular hardware component malfunctions and requires a replacement part. Through generating and accessing failure rate data, various failure rate analytics may be performed individually on a particular component type as well as at a broader level with respect to a single automation system or multiple automation systems.

Furthermore, intelligent use of failure rate data may provide decision-making functionality regarding replacement operations, extending the usage date of a particular automation system, and performing various objective analyses. For example, a component supply manager may collect valuable information regarding various stakeholders, maintenance operations, performance of different suppliers, and identify various conditions of multiple automation systems using replacement data and/or failure rate data. This decision-making functionality may be provided as recommendations within a graphical user interface on a user device or performed automatically through commands in the background of a network by a component supply manager.

Figure 1:
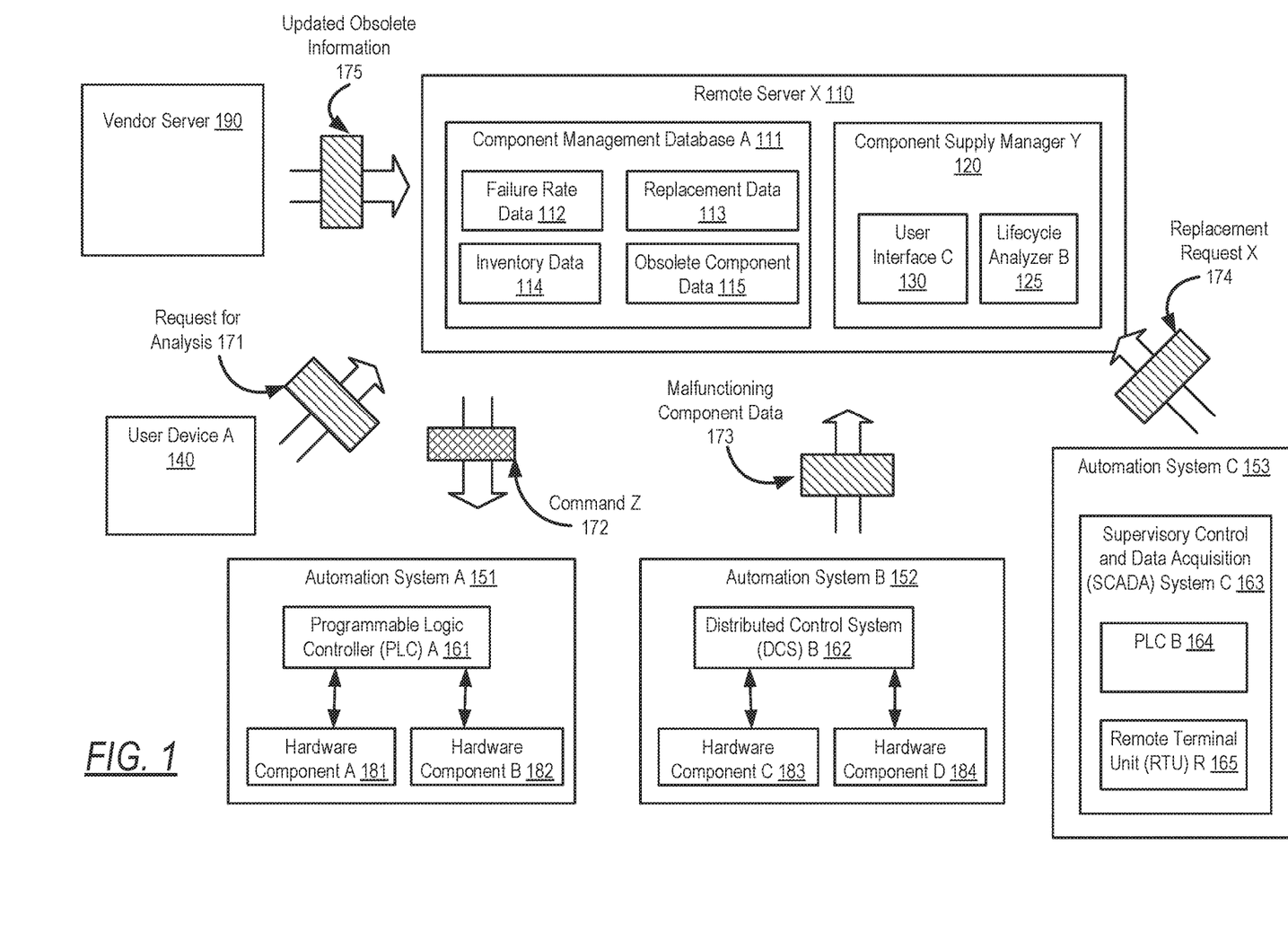
FIGS. 1 and 2 show systems in accordance with one or more embodiments.

Turning to FIG. 1, FIG. 1 shows a schematic diagram in accordance with one or more embodiments. As shown in FIG. 1, a remote server (e.g., remote server X (110)) may communicates over a network (not shown) with various user devices (e.g., user device A (140)), various servers (e.g., vendor server (190)), and various automation systems (e.g., automation system A (151), automation system B (152), automation system C (153)). A remote server may include hardware and/or software disposed in a cloud computing environment at a remote location from various network devices (e.g., user device A (140), the automation systems (151, 152, 153), etc.). An automation system may include a control system that monitors and/or operates equipment, where the equipment may include various machinery such as one or more hardware components (e.g., hardware component A (181), hardware component B (182), hardware component C (183), hardware component D (184)). Examples of control systems that are used to implement automation systems include a programmable logic controller (PLC) (e.g., PLC A (161)), a distributed control system (DCS) (e.g., DCS B (162)), or a supervisory control and data acquisition (SCADA) system (e.g., SCADA system C (163)).

Turning to PLCs, a programmable logic controller may control valve states, fluid levels, pipe pressures, warning alarms, pressure releases and/or various hardware components throughout a facility, such as a plant or refinery. Thus, a programmable logic controller may be a ruggedized computer system with functionality to withstand vibrations, extreme temperatures, wet conditions, and/or dusty conditions, such as those around a refinery or drilling rig. With respect to distributed control systems, a distributed control system may be a computer system for managing various processes at a facility using multiple control loops. As such, a distributed control system may include various autonomous controllers (such as remote terminal units) positioned at different locations throughout the facility to manage operations and monitor processes. Likewise, a distributed control system may include no single centralized computer for managing control loops and other operations. On the other hand, a SCADA system may include a control system that includes functionality for enabling monitoring and issuing of process commands through local control at a facility as well as remote control outside the facility. For example, a SCADA system may include one or more supervisory computers, one or more remote terminal units (e.g., RTU R (164)), one or more PLCs (e.g., PLC B (164)), communication infrastructure such as network elements, a human-machine interface, and/or a historian, etc. With respect to an RTU, an RTU may include hardware and/or software, such as a microprocessor, that connects sensors and/or actuators using network connections to perform various processes in the automation system. Thus, the RTU may connect and enable communication between these process elements and a supervisory computer system.

Turning to automation systems, examples of automation systems may include an emergency shut down (ESD) system, a video management system (VMS), a carbon capture and storage (CCS) system, a terminal management system (TMS), custody metering systems, process analyzers, various manufacturing systems, other industrial systems, etc. Examples of hardware components in an automation system may include crude oil preheaters, heat exchangers, pumps, valves, compressors, loading racks, and storage tanks among various other types of hardware components. Hardware components may also include various network elements or control elements for implementing automation systems, such as switches, routers, hubs, PLCs, remote terminal units, user equipment, or any other technical components for performing specialized processes.

In some embodiments, a remote server includes a component supply manager (e.g., component supply manager Y (120)) that includes hardware and/or software with functionality for managing and analyzing component types and/or various automation systems (e.g., automation system A (151), automation system B (152), automation system C (153)). For example, a component supply manager may minimize on-site storage of high technology instrumentation spare parts that require technical support, be prone to obsolescence, and/or require frequent upgrades. Likewise, the component supply manager may provide a centralized contact for various hardware consumers (e.g., different facilities with different automation systems) to provide spare parts from a centralized location or depot.

In some embodiments, the component supply manager includes functionality for managing replacement requests (e.g., replacement request X (174)), purchase orders, monitoring inventory levels of spare parts, and managing delivery of replacement components within a predetermined period of time (e.g., within 24 hours for critical parts). For example, a component supply manager may communicate with various vendor servers (e.g., vendor server (190)) to determine current inventory levels of replacement components as well as future supplies. A component supply manager, user equipment, user devices, remote servers, and/or vendor servers may be computer systems similar to the computer system (602) described in FIG. 6 and the accompanying description.

In some embodiments, the component supply manager may determine failure rate data (e.g., failure rate data (112)) regarding component failures in one or more automation systems. Failure rate data may be based on information regarding various replacement requests and/or purchase orders regarding individual hardware components managed by a component supply manager. Likewise, failure rate data may also correspond to malfunctioning component data obtained from an automation system (e.g., malfunctioning component data (173)). If the automation system A (151) obtains a replacement of hardware component A (181) multiple times per year, for example, the component supply manager may use the replacement data to determine a failure rate of the component type of hardware component A (181). For example, replacement data may correspond to replacement requests or purchase orders for various hardware replacement components during routine maintenance or in response to malfunctioning hardware components. Replacement data may be associated with a particular component type, such that a component supply manager may determine the frequency that the component type is replaced by one or more automation systems at one or more facility locations.

In some embodiments, a component supply manager analyzes the failure rates for multiple hardware components in an automation system to determine an overall failure rate of the automation system. As such, a user device (e.g., user device A (140)) may transmit a request (e.g., request for analysis (171)) to a component supply manager that requests a particular analysis of a component type and/or a particular automation system. Examples of analyses include failure rate determinations for a component type or automation system, lifecycle extensions of an automation system, performance indicators of vendors who supply spare parts, etc.

In some embodiments, a component supply manager is coupled to a component management database (e.g., component management database A (111)). For example, the component manage database may store failure rate data (e.g., failure rate data (112)), replacement data (e.g., replacement data (113)), inventory data (e.g., inventory data (114)), obsolete component data (e.g., obsolete component data (115)) and other information associated with a particular component type or automation system. In response to a request to determine a failure rate for a specific component type, for example, a component supply manager may access the component management database to determine the current failure rate of the specific component type. Likewise, the component supply manager may also determine whether the failure rate has changed based on past replacement requests or other available information.

In some embodiments, a component supply manager includes functionality for purchasing hardware components based on requests from user devices and/or automation systems. More specifically, a component supply manager may provide an ordering tool to various users. Thus, a component supply manager may replace a physical counting process by operating in the background to replacement requests and purchases orders for ascertaining inventory levels of a particular component type. In doing so, the component supply manager may monitor demand for replacement components as well as changes in inventory levels. When a user device detects a malfunctioning component at an automation system, for example, the user device may use an interface (e.g., user interface C (130)) to purchase a replacement component from a vendor (e.g., through vendor's server (190)). Likewise, the component supply manager may automatically order spare parts in response to detecting inventory levels are below a predetermined threshold and analyzing past failure rate statistics.

In some embodiments, a component supply manager includes a user interface (e.g., user interface C (130)) that enables communication with multiple user devices (e.g., user device A (140)) and/or automation systems (e.g., automation system A (151)). In particular, the component supply manager may include hardware and/or software that provides a user interface to various user devices over a network or in a cloud computing environment. As such, a user interface may be hardware and/or software that includes functionality for presenting data and/or receiving inputs from a user regarding replacement requests and/or commands in response to failure rate data and/or various analyses. For example, a component supply manager may include software to provide a graphical user interface for presenting data and/or receiving commands to initiate various operations and analyze failure rate data.

In some embodiments, a component supply manager includes functionality for transmitting one or more commands (e.g., command Z (172)) to user devices and/or automation systems. For example, a command may be a replacement command that triggers a replacement operation of a component type used by a respective automation system to a different hardware component type. A replacement operation may be performed in connection with a technician that services the respective automation system with the replaced component type. In some embodiments, the command is a data message implemented with a machine-to-machine communication protocol that triggers a notification in a human machine interface. This notification may alert the technician that a different component type should be used in the automation system. A command may also trigger an expiration date or modify a usage date of an automation system, e.g., initiating a replacement operations of the automation system that must be performed by a predetermined time.

Figure 2:
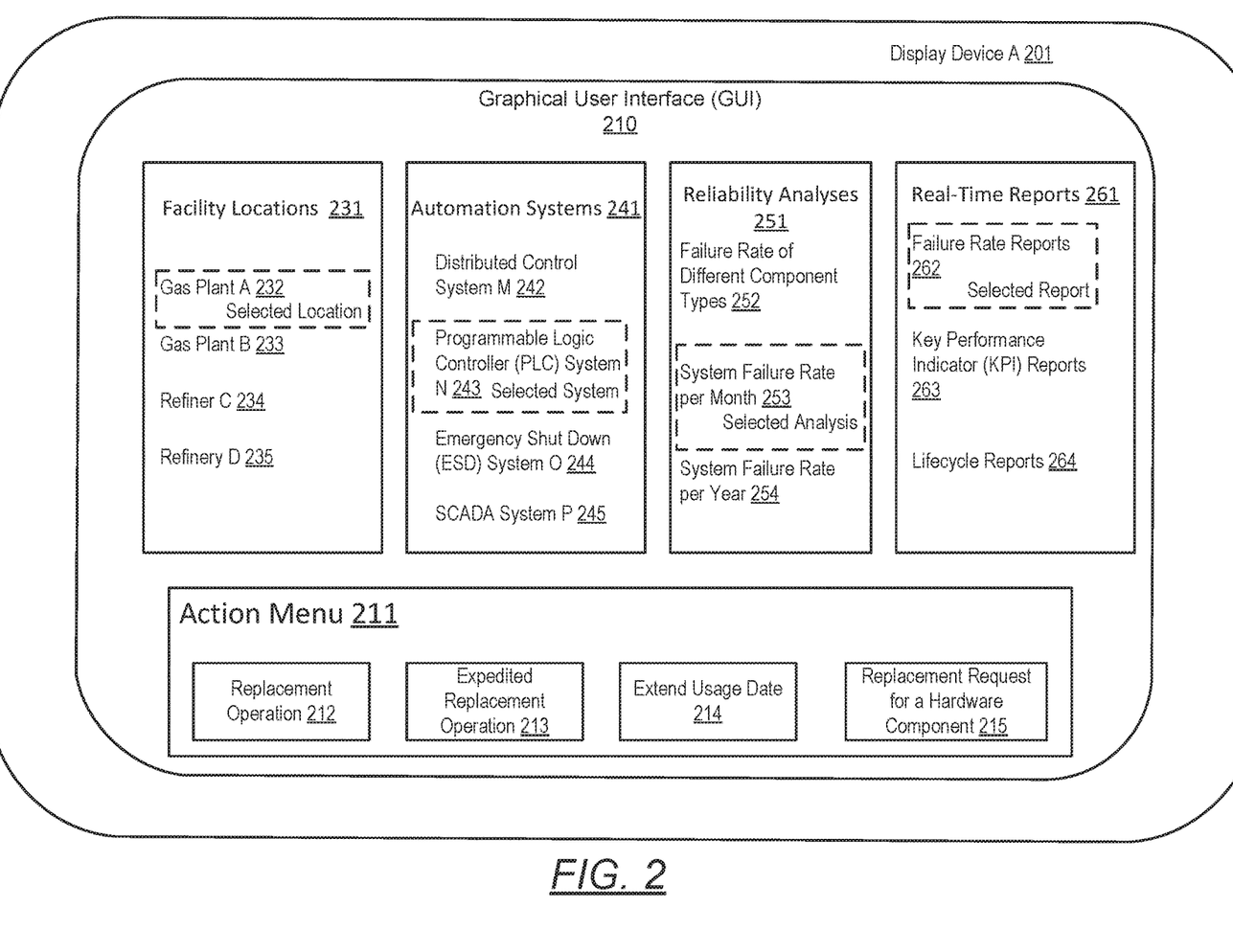

Turning to FIG. 2, FIG. 2 illustrates an example of monitoring various automation systems using a component supply manager and through a user interface in accordance with one or more embodiments. In FIG. 2, a graphical user interface (GUI) (210) is provided on a display device A (201) of a user device (not shown). As shown in FIG. 2, the GUI (210) may provide information regarding various automation systems (241) that are located at various facility locations (231), such as gas plant A (232), gas plant B (233), refinery C (234), and refinery D (235). For example, gas plant A (232) includes various automation systems (i.e., distributed control system M (242), PLC system N (243), ESD system O (244), and a SCADA system P (245). Thus, a user may select gas plant A (232) and then the PLC system N (243) through the GUI (210) in order to perform one or more reliability analyses (251). Accordingly, in response to a user selecting an analysis for the PLC system N (243), a component supply manager may determine a failure rate of different component types (252) in the PLC system N (243), a system failure rate per month (253) of the selected automation system, and/or a system failure rate per year (254) of the selected automation system. Likewise, the GUI (210) may provide various real-time reports (261) regarding a particular analysis, such as failure rate reports (262) (e.g., a report that provide past failure rate information or predicts future failure rate information regarding a component type or an automation system type), key perform indicator (KPI) reports (263) (e.g., a report that compares an automation system to various metrics based on failure rate data, such as annual replacement costs, comparisons with other automation system types, etc.) and/or lifecycle reports (264) (e.g., reports regarding past usage date extensions as well as reports regarding predictions on future expiration dates of various automation systems). Other reports are also contemplated, such as obsolete component reports (e.g., a report that describes various obsolete component types associated with a particular automation system), nonproductive time reports (e.g., a report regarding how a component type's failure rate or an automation system's failure rate relates to nonproductive time), etc.

Keeping with FIG. 2, in some embodiments, a component supply manager provides an action menu (211) to a user for selecting one or more commands based on failure rate data or other information. For example, the action menu (211) may be a GUI window that automatically provides various recommendation options based on various predetermined criteria. In particular, the GUI (210) may provide commands to perform a replacement operation (212), an expedited replacement operation (213), a command to extend a usage date (214) of a component type or automation system, or a command to perform a replacement request (215) for a hardware component. In some embodiments, a component supply manager automatically transmits one or more commands in response to monitoring failure rate data, inventory data, obsolete component data, etc.

Returning to FIG. 1, a component supply manager may use failure rate data to adjust a usage date of one or more component types and/or one or more automation systems. In particular, a usage date may refer to the end date when a component type or automation system needs to cease usage and be replaced by a different component type or automation system. For example, a component supply manager may include a lifecycle analyzer (e.g., lifecycle analyzer B (125)) that determines whether one or more component types used by the automation system are obsolete. In particular, the lifecycle analyzer may receive updates (e.g., updated obsolete information (175) from vendor's server (190)) regarding whether a particular component vendor is ceasing manufacturing on a particular component type. However, even after production is discontinued on a particular component type, supplies of the component type may exist from third-party vendors as well as in a company's own spare part inventory. Thus, a lifecycle analyzer may determine whether to extend usage of an automation system or particular component type based on failure rate data as well as obsolete component data (e.g., obsolete component data (115)) regarding the hardware components that are used by the automation system. Accordingly, a hardware component type may be assigned a usage date that expires at a predetermined time or requires another lifecycle analysis based on obsolete component data and/or failure rate data. Accordingly, a lifecycle analyzer may update the usage date based on spare part inventories, changes in failure rates, component types becoming obsolete, etc. Moreover, a lifecycle analysis may be based on past and predicted inventory levels (e.g., inventory data (114)) of one or more hardware component types.

Furthermore, a component supply manager may use a GUI to provide visibility of obsolete and upgraded components along with decision-making functionality. In other words, a component supply manager may provide various user devices with information in order to determine whether to replace existing automation systems or extend the usage date of one or more automation systems. Likewise, a component supply manager may analyze failure rate data and inventory data to determine various shortages of hardware parts, and current as well as future available quantities of various component types. A GUI may further provide information regarding inventory values, consumption rates of replacement components, and/or performance of various component suppliers (e.g., quality of provided hardware components, delivery times between requesting and receiving hardware components, etc.). The GUI may further provide reports regarding operation expenses, and budgets.

While FIGS. 1 and 2 show various configurations of components, other configurations may be used without departing from the scope of the disclosure. For example, various components in FIGS. 1 and 2 may be combined to create a single component. As another example, the functionality performed by a single component may be performed by two or more components.

Figure 3:
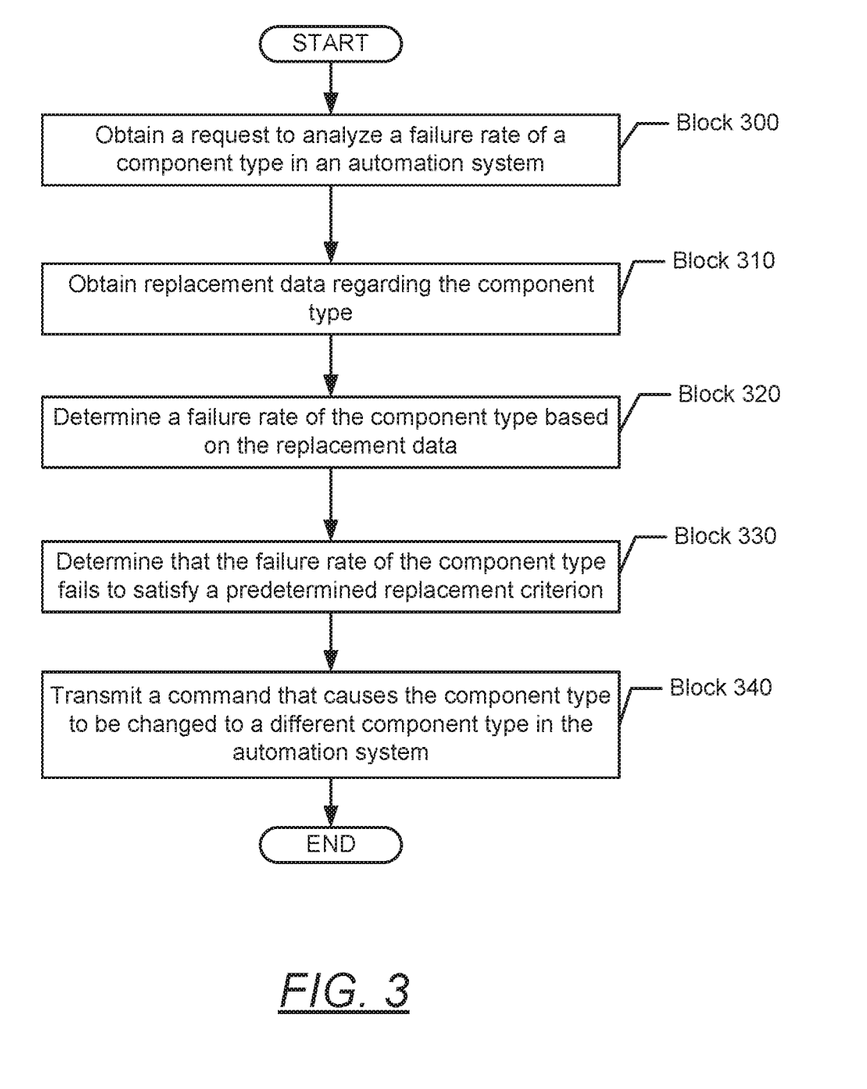
FIG. 3 shows a flowchart in accordance with one or more embodiments.

Turning to FIG. 3, FIG. 3 shows a flowchart in accordance with one or more embodiments. Specifically, FIG. 3 describes a general method for determining and/or managing failure rates among hardware components. One or more blocks in FIG. 3 may be performed by one or more components (e.g., component supply manager Y (120)) as described in FIGS. 1 and 2. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 300, a request is obtained to analyze a failure rate of a component type in an automation system in accordance with one or more embodiments. For example, the request may be a data message transmitted by a user device to a remote server that triggers an analysis regarding failure rate data, inventory data, replacement data, and/or obsolete component data. In some embodiments, the request is performed automatically by a component supply manager at predetermined times, e.g., to determine whether current inventory levels of one or more component types can satisfy future hardware component consumption by multiple automation systems. The request for analysis may be similar to the request for analysis (171) described above in FIG. 1 and the accompanying description.

In Block 310, replacement data are obtained regarding a component type in accordance with one or more embodiments. In some embodiments, for example, a component supply manager may monitor replacement requests or purchase orders for various hardware replacement components. In some embodiments, replacement data may be based on changes in inventory levels for various hardware replacement components at a central depository for replacement components. The replacement data may be similar to the replacement data (113) described above in FIG. 1 and the accompanying description.

In Block 320, a failure rate of a component type is determined based on replacement data in accordance with one or more embodiments. In some embodiments, for example, replacement data is analyzed with respect to a predetermined time period, e.g., a month, year, etc. Based on this analysis, a specific failure rate for a component type may be determined. Thus, failure rates for similar components may be compared and analyzed in order to optimize a particular automation system. For example, if one component type has a lower failure rate than another component type, a hardware component in an automation system may be replaced with the better component type. Likewise, individual failure rates of multiple component types in an automation system may be used by a component supply manager to determine a failure rate of the automation system.

In Block 330, a determination is made that a failure rate of a component type fails to satisfy a predetermined replacement criterion in accordance with one or more embodiments. For example, a replacement criterion may be set by a user device and based on whether sufficient replacement components exist for a component type. Given a particular failure rate, a component supply manager may determine whether an automation system can reach its current usage date or whether a shortage of hardware components may occur before this usage date expires. To illustrate, if an obsolete component type has a very low failure rate and sufficient quantities of the obsolete component type exist within a company's current inventory, the failure rate of the obsolete component type may satisfy a replacement criterion. On the other hand, if a component type has a very high failure rate, the failure rate may exceed a replacement criterion even if there are sufficient supplies of the hardware component exist. The cost of replacing the component type may simply outweigh use of the component type. Therefore, the replacement criterion may be based on nonproductive time resulting from component failures, technician costs associated with replacing this type of hardware component, inventory supplies, etc.

In Block 340, a command is transmitted that causes a component type to be changed to a different component type in an automation system in accordance with one or more embodiments. In some embodiments, for example, a component supply manager provides a recommendation to a user device regarding replacement of a current component type to one or more different component types based on failing the predetermined replacement criterion. The recommendation may be presented to a user within a graphical user interface similar to GUI (210) described above in FIG. 2 and the accompanying description. After a user selects a different component type, the component supply manager may transmit one or more commands to trigger a replacement operation of the current component type.

In some embodiments, a component supply manager automatically transmits one or more commands in response to monitoring failure rate data, obsolete component data, inventory data, etc. For example, a component supply manager receives a notification that manufacturing is discontinued on a component type with very few spare replacement components, the component supply manager may automatically transmit a command to initiate replacement operations to any automation system that uses the discontinued component type. Thus, the component supply manager may identify multiple automation systems using a component management database that use the discontinued component type.

Figure 4:
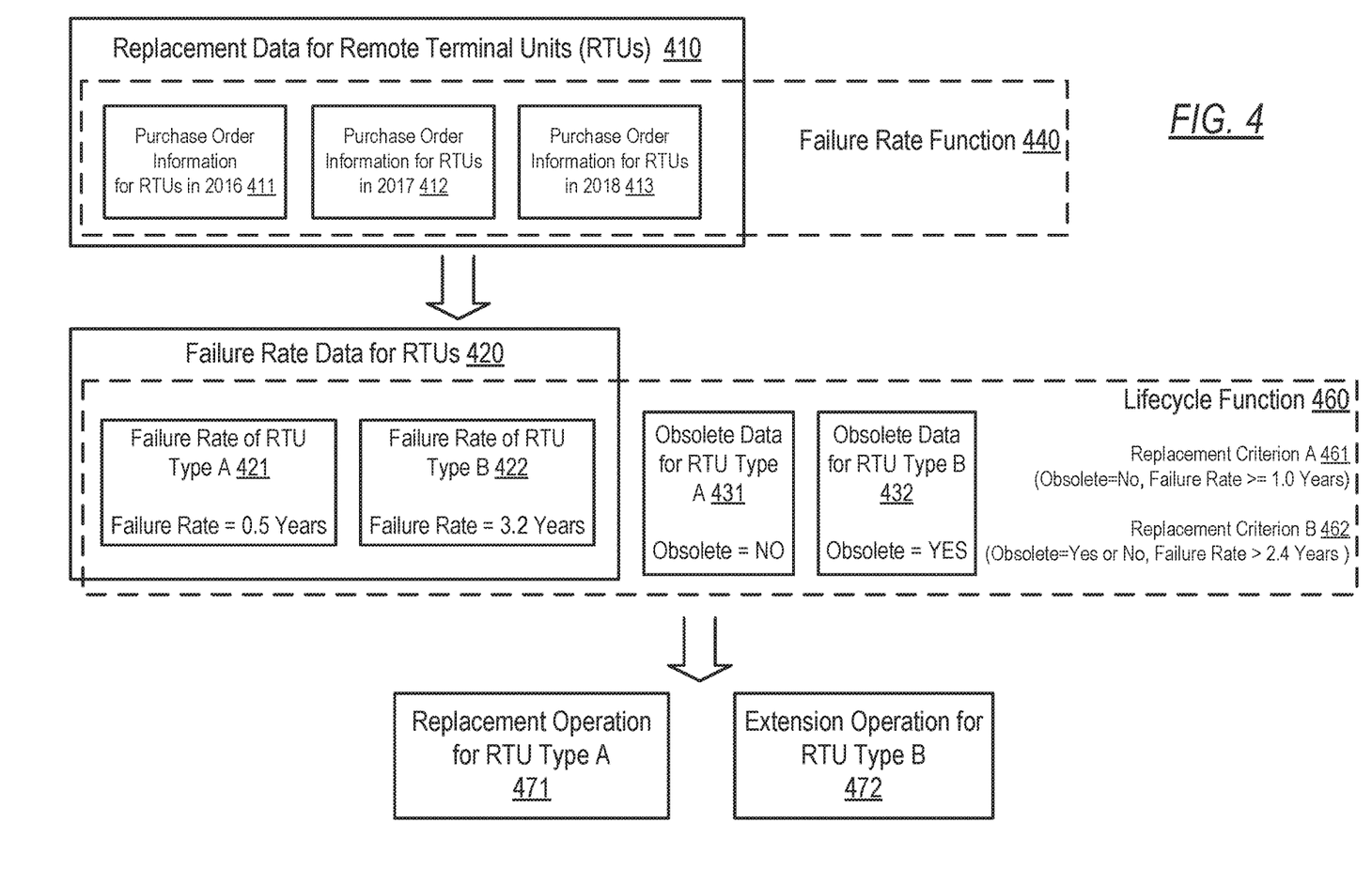
FIG. 4 shows an example in accordance with one or more embodiments.

Turning to FIG. 4, FIG. 4 provides an example of determining a replacement operations and extending usage date using predetermined replacement criterion in accordance with one or more embodiments. The following example is for explanatory purposes only and not intended to limit the scope of the disclosed technology. FIG. 4 shows replacement data (410) for remote terminal units that is stored in a database. Specifically, the replacement data (410) includes purchases order information for RTUs in the year 2016 (411), the year 2017 (412), and the year 2018 (413). Accordingly, a failure rate function (440) is performed on the purchase order information (411, 412, 413) by a component supply manager in order to obtain failure rate data for RTUs (420) (i.e., failure rate of RTU type A (421), failure rate of RTU type B (422)). In particular, the component supply manager determines that a remote terminal unit of type A requires a replacement once every 0.5 years or six months. On the other hand, the component supply manager also determines that a remote terminal unit of type B requires a replacement once every 3.2 years.

Keeping with FIG. 4, the component supply manager performs an analysis on the failure rate data (420) using a lifecycle function (460). Here, the lifecycle function (460) uses two replacement criterion (i.e., replacement criterion A (461) and replacement criterion B (462)) to determine whether to replace RTUs of type A or type B. Where type A or type B satisfies at least one of the replacement criteria (461, 462), the component supply manager automatically extends the usage date of the respective component type to a predetermined date in the future. More specifically, replacement criterion A (461) requires a component type to be currently manufactured as well as failure of a replacement component to occur no more once per year. With respect to replacement criterion B (462), a component type may be obsolete or non-obsolete, but a component type must average a replacement no less than once every 2.4 years. After using the lifecycle function (460) with the failure rate data (420), obsolete data (431) for RTU type A, and obsolete data (432) for RTU type B, a component supply manager determines a replacement operation (471) for RTU type A and an extension operation (472) for RTU type B. In other words, the component supply manager subsequently transmits various commands to one or more automation systems to trigger a replacement operation for RTUs corresponding to type A. The component supply manager also sends various notifications to multiple automation systems with RTUs of type B that their usage is being extended to a future date.

Figure 5:
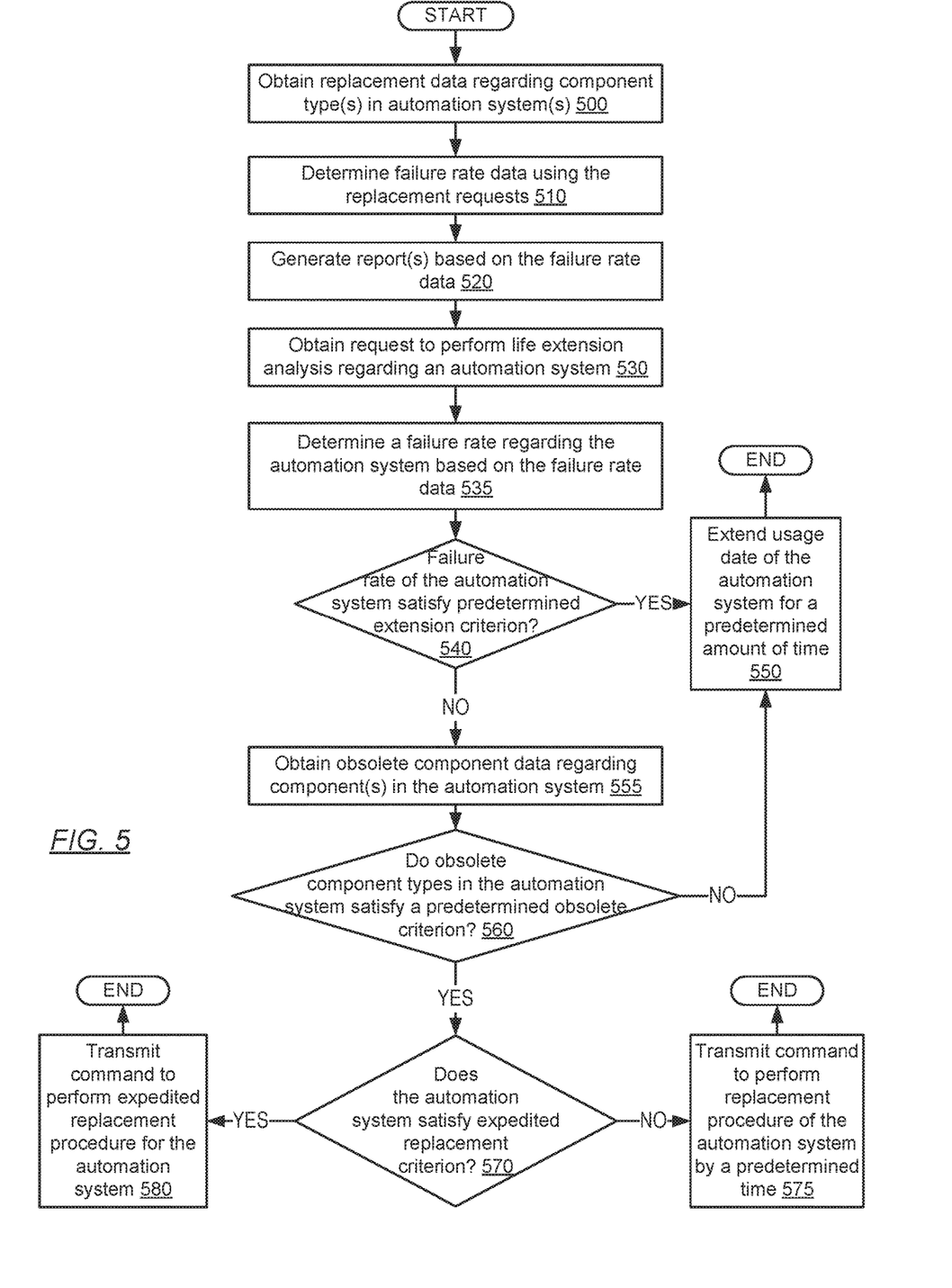
FIG. 5 shows a flowchart in accordance with one or more embodiments.

Turning to FIG. 5, FIG. 5 shows a flowchart in accordance with one or more embodiments. Specifically, FIG. 5 describes a specific method for performing one or more lifecycle analyses regarding one or more automation systems. One or more blocks in FIG. 5 may be performed by one or more components (e.g., component supply manager Y (120)) as described in FIGS. 1 and 2. While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 500, replacement data are obtained regarding one or more component types in various automation systems in accordance with one or more embodiments. For example, a component supply database may record purchase orders, work service orders, replacement requests by user devices, etc. For more information on replacement data, see FIG. 1 and Block 310 of FIG. 3 above and the accompanying description.

In Block 510, failure rate data are determined using various replacement requests in accordance with one or more embodiments. In some embodiments, failure rate data from multiple automation systems is collected for use in analyzing the failure rate of a particular automation system. For example, failure rate of a particular component type may be collected across multiple automation systems in order to evaluate a particular automation system's failure rate. Block 510 may be similar to Block 320 described above in FIG. 3 and the accompanying description.

In Block 520, one or more reports are generated based on failure rate data in accordance with one or more embodiments. In response to a request for analysis, for example, a component supply manager may transmit one or more reports regarding changes in failure rates and predicted spare part inventory levels with respect to one or more component types and/or one or more automation systems. In some embodiments, a component supply manager automatically transmits one or more reports in response to a supply event. For example, after receiving a notification from a vendor that support for one or more hardware components or their related software is being discontinued, the component supply manager may transmit a report regarding which automation systems may require a replacement operation based on predetermine replacement criteria.

In some embodiments, a component supply manager provides an on-time monitoring user interface that provides information on key performance indicators (KPIs), historical trends, and/or failure statistics for hardware components being managed by the component supply manager. Accordingly, the user interface may facilitate decision-making processes to replace/extend the life of existing automation systems. Thus, the component supply manager may provide an interactive tool to various segregated systems, such as to identify acceptable upgrades and/or replacement options. In some embodiments, the component supply manager may provide recommendations based on various analyses regarding which component types and/or automation systems should be implemented.

In Block 530, a request is obtained to perform a lifecycle analysis regarding an automation system in accordance with one or more embodiments. In some embodiments, for example, a component supply manager performs a lifecycle analysis regarding whether the usage date of an automation system should be extended, replaced, or have an expedited replacement. In contrast to determining whether to continue to use a component type or change to a different component type as described above in FIG. 3, a lifecycle analysis may analyze an automation system that includes multiple hardware components having multiple component types. Thus, a lifecycle analysis may determine whether an automation system should be replaced by a different automation system depending on inventory levels of obsolete components, failure rates of different component types, etc. For more information on a lifecycle analysis, see Blocks 540-580 and the accompanying description below.

In Block 535, a failure rate regarding an automation system is determined based on failure rate data in accordance with one or more embodiments. For example, an automation system's failure rate may depend on multiple underlying failure rates. The automation system's failure rate may be associated with a particular probability that one of the underlying hardware components requires a replacement. On other hand, a failure rate for an automation system may also be determined in a similar manner as the failure rate of a particular component type, e.g., based on purchase orders for hardware components for a respective automation system.

In Block 540, a determination is made whether a failure rate of an automation system satisfies a predetermined extension criterion in accordance with one or more embodiments. Similar to a replacement criterion, a component supply manager may analyze failure rate data for an automation system using one or more predetermined extension criteria, e.g., whether the failure rate exceeds a failure rate threshold. Examples of extension criteria may include numbers of obsolete components, whether any particular component type exceeds a specific failure rate, the overall failure rate of the automation system, etc. Where a determination is made that the failure rate of an automation system satisfies a predetermined extension criterion, the process shown in FIG. 5 may proceed to Block 550. Where a determination is made that the failure rate of an automation system fails to satisfy a predetermined extension criterion, the process shown in FIG. 5 may proceed to Block 550.

In Block 550, a usage date of an automation system is extended for a predetermined amount of time in accordance with one or more embodiments. The usage data may be a predetermined data when another lifecycle analysis is performed regarding an automation system or when the automation system is scheduled for replacement. Thus, the usage date may be extended by a predetermined amount or using a function based on multiple factors such as individual component failure rates and number of obsolete components.

In Block 555, obsolete component data are obtained regarding one or more components in an automation system in accordance with one or more embodiments. The obsolete component data may be similar to the obsolete component data (115) described above in FIG. 1 and the accompanying description.

In Block 560, a determination is made whether one or more obsolete component types in an automation system satisfy a predetermined obsolete criterion in accordance with one or more embodiments. For example, a component supply manager may determine which component types are associated with a particular automation system. After identifying a list of component types, the component supply manager may determine which component types are obsolete. As such, a component supply manager may analyze an automation system with the obsolete criterion to determine whether the number of obsolete components allows for extension of a usage date or whether a replacement operation is required. Where a determination is made that no component types are obsolete or an obsolete component criterion is satisfied, the process shown in FIG. 5 may proceed to Block 550. When a determination is made whether the number of obsolete components fails to satisfy an obsolete criterion, the process may proceed to Block 570.

In Block 570, a determination is made whether an automation system satisfies an expedited replacement criterion in accordance with one or more embodiments. Similar to the replacement criterion, the extension criterion, and the obsolete criterion described above, a component supply manager may also use an expedited replacement criterion to determine when a replacement operation should be performed. For example, the expedited replacement criterion may correspond to a number of replacement components being below a predetermined failure rate threshold for the automation system's obsolete components. Where a determination is made that an expedited replacement criterion is satisfied, the process shown in FIG. 5 may proceed to Block 580. When a determination is made that an expedited replacement criterion is not satisfied, the process shown in FIG. 5 may proceed to Block 575.

In Block 575, a command is transmitted causing a replacement procedure to be performed regarding an automation system by a predetermined time in accordance with one or more embodiments.

In Block 580, a command is transmitted causing an expedited replacement procedure to be performed regarding an automation system in accordance with one or more embodiments. In particular, an expedited replacement procedure may occur by an earlier time than the replacement operation in Block 575.

Figure 6:
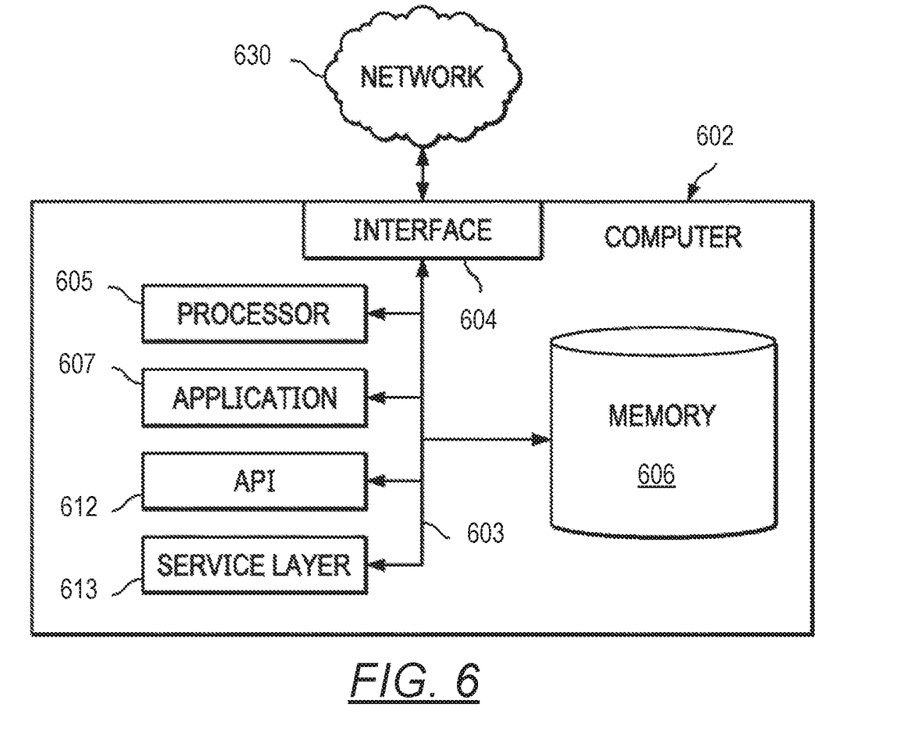
FIG. 6 shows a computer system in accordance with one or more embodiments.

Embodiments may be implemented on a computer system. FIG. 6 is a block diagram of a computer system (602) used to provide computational functionalities associated with described algorithms, methods, functions, processes, flows, and procedures as described in the instant disclosure, according to an implementation. The illustrated computer (602) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (602) may include a computer that includes an input device, such as a keypad, keyboard, touch screen, or other device that can accept user information, and an output device that conveys information associated with the operation of the computer (602), including digital data, visual, or audio information (or a combination of information), or a GUI.

The computer (602) can serve in a role as a client, network component, a server, a database or other persistency, or any other component (or a combination of roles) of a computer system for performing the subject matter described in the instant disclosure. The illustrated computer (602) is communicably coupled with a network (630). In some implementations, one or more components of the computer (602) may be configured to operate within environments, including cloud-computing-based, local, global, or other environment (or a combination of environments).

At a high level, the computer (602) is an electronic computing device operable to receive, transmit, process, store, or manage data and information associated with the described subject matter. According to some implementations, the computer (602) may also include or be communicably coupled with an application server, e-mail server, web server, caching server, streaming data server, business intelligence (BI) server, or other server (or a combination of servers).

The computer (602) can receive requests over network (630) from a client application (for example, executing on another computer (602)) and responding to the received requests by processing the said requests in an appropriate software application. In addition, requests may also be sent to the computer (602) from internal users (for example, from a command console or by other appropriate access method), external or third-parties, other automated applications, as well as any other appropriate entities, individuals, systems, or computers.

Each of the components of the computer (602) can communicate using a system bus (603). In some implementations, any or all of the components of the computer (602), both hardware or software (or a combination of hardware and software), may interface with each other or the interface (604) (or a combination of both) over the system bus (603) using an application programming interface (API) (612) or a service layer (613) (or a combination of the API (612) and service layer (613). The API (612) may include specifications for routines, data structures, and object classes. The API (612) may be either computer-language independent or dependent and refer to a complete interface, a single function, or even a set of APIs. The service layer (613) provides software services to the computer (602) or other components (whether or not illustrated) that are communicably coupled to the computer (602). The functionality of the computer (602) may be accessible for all service consumers using this service layer. Software services, such as those provided by the service layer (613), provide reusable, defined business functionalities through a defined interface. For example, the interface may be software written in JAVA, C++, or other suitable language providing data in extensible markup language (XML) format or other suitable format. While illustrated as an integrated component of the computer (602), alternative implementations may illustrate the API (612) or the service layer (613) as stand-alone components in relation to other components of the computer (602) or other components (whether or not illustrated) that are communicably coupled to the computer (602). Moreover, any or all parts of the API (612) or the service layer (513) may be implemented as child or sub-modules of another software module, enterprise application, or hardware module without departing from the scope of this disclosure.

The computer (602) includes an interface (604). Although illustrated as a single interface (604) in FIG. 6, two or more interfaces (604) may be used according to particular needs, desires, or particular implementations of the computer (602). The interface (604) is used by the computer (602) for communicating with other systems in a distributed environment that are connected to the network (630). Generally, the interface (604 includes logic encoded in software or hardware (or a combination of software and hardware) and operable to communicate with the network (630). More specifically, the interface (604) may include software supporting one or more communication protocols associated with communications such that the network (630) or interface's hardware is operable to communicate physical signals within and outside of the illustrated computer (602).

The computer (602) includes at least one processor (605). Although illustrated as a single processor (605) in FIG. 6, two or more processors may be used according to particular needs, desires, or particular implementations of the computer (602). Generally, the processor (605) executes instructions and manipulates data to perform the operations of the computer (602) and any algorithms, methods, functions, processes, flows, and procedures as described in the instant disclosure.

The computer (602) also includes a memory (606) that holds data for the computer (602) or other components (or a combination of both) that can be connected to the network (630). For example, memory (606) can be a database storing data consistent with this disclosure. Although illustrated as a single memory (606) in FIG. 6, two or more memories may be used according to particular needs, desires, or particular implementations of the computer (602) and the described functionality. While memory (606) is illustrated as an integral component of the computer (602), in alternative implementations, memory (606) can be external to the computer (602).

The application (607) is an algorithmic software engine providing functionality according to particular needs, desires, or particular implementations of the computer (602), particularly with respect to functionality described in this disclosure. For example, application (607) can serve as one or more components, modules, applications, etc. Further, although illustrated as a single application (607), the application (607) may be implemented as multiple applications (607) on the computer (602). In addition, although illustrated as integral to the computer (602), in alternative implementations, the application (607) can be external to the computer (602).

There may be any number of computers (602) associated with, or external to, a computer system containing computer (602), each computer (602) communicating over network (630). Further, the term "client," "user," and other appropriate terminology may be used interchangeably as appropriate without departing from the scope of this disclosure. Moreover, this disclosure contemplates that many users may use one computer (602), or that one user may use multiple computers (602).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plusfunction clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A method, comprising:
   obtaining, by a remote server and from a plurality of replacement requests for a plurality of hardware components, replacement data regarding the plurality of hardware components from a plurality of automation systems;
   wherein the plurality of replacement requests are transmitted by the plurality of automation systems over a network to the remote server, and
   wherein the replacement data describe component replacements of a plurality of component types that are used by the plurality of automation systems and include purchase order information for the plurality of hardware components;
   determining, by the remote server without accessing a database remote from the remote server, a failure rate of a first component type using the replacement data, wherein the first component type is associated with at least one automation system among the plurality of automation systems;
   determining, by the remote server, whether the failure rate of the first component type satisfies a predetermined replacement criterion;
   determining, by the remote server, whether the automation system satisfies an expedited replacement criterion; and
   transmitting, by the remote server and in response to determining that the failure rate of the first component type fails to satisfy the predetermined replacement criterion and determining whether the automation system satisfies the expedited replacement criterion, a command to a first automation system among the plurality of automation systems by a predetermined time or an earlier time than the predetermined time,
   wherein the command is configured to cause the first automation system to replace a first hardware component corresponding to the first component type with a second hardware component corresponding to a second component type, and
   wherein the first component type is different from the second component type.

2. The method of claim 1,
   wherein the remote server monitors a number of replacement requests for the first component type and the second component type, and
   wherein the remote server determines the failure rate of the first component type using the number of replacement requests over a predetermined time period.

3. The method of claim 1,
   wherein the first automation system is a supervisory control and data acquisition (SCADA) systems and the first hardware component comprises a first remote terminal unit that comprises a first microprocessor,
   wherein the command causes the first automation system to replace the first remote terminal unit with a second remote terminal unit that comprises a second microprocessor, and
   wherein the second remote terminal unit has a lower failure rate than the first remote terminal unit.

4. The method of claim 1, further comprising:
   obtaining failure rate data and obsolete component data regarding a second automation system among the plurality of automation systems;
   determining whether to extend a usage date of the second automation system based on whether the failure rate data and the obsolete component data satisfy a predetermined extension criterion; and
   transmitting, in response to the failure rate data and the obsolete component data failing to satisfy the predetermined extension criterion, a command to cause the second automation system to be replaced by a third automation system.

5. The method of claim 4,
   wherein the predetermined extension criterion corresponds to a predetermined number of obsolete component types that are used by the second automation system and a failure rate threshold.

6. The method of claim 1, further comprising:
   obtaining a request to perform a first lifecycle analysis on a second automation system;
   determining whether to extend a usage date of the second automation system based on obsolete component data regarding the second automation system; and
   assigning, in response to determining that that the obsolete component data satisfies a predetermined extension criterion, a predetermined date for performing a second lifecycle analysis on the second automation system.

7. The method of claim 1,
   wherein the predetermined replacement criterion corresponds to a predetermined number of component failures over a predetermined amount of time.

8. The method of claim 1, further comprising:
   transmitting, by the remote server in real-time, a report to a user device regarding the plurality of automation systems,
   wherein the report is presented in the user device using a graphical user interface that describes a consumption of replacement components by the plurality of automation systems.

9. A server, comprising:
   a processor; and
   a memory coupled to the processor, wherein the memory comprises functionality for:
   obtaining, from a plurality of automation systems, a plurality of replacement requests regarding a plurality of hardware components,
   obtaining, from the plurality of replacement requests, replacement data, wherein the replacement data include purchase order information for the plurality of hardware components, and
   wherein the plurality of replacement requests are transmitted by the plurality of automation systems over a network to the server;
   determining, without accessing a database remote from the memory, a failure rate of a first component type using the plurality of replacement requests, wherein the first component type is associated with at least one automation system among the plurality of automation systems;
   determining whether the failure rate of the first component type satisfies a predetermined replacement criterion;
   determining whether the automation system satisfies an expedited replacement criterion; and
   transmitting, in response to determining that the failure rate of the first component type fails to satisfy the predetermined replacement criterion and determining whether the automation system satisfies the expedited replacement criterion, a command to a first automation system among the plurality of automation systems by a predetermined time or an earlier time than the predetermined time, wherein the command is configured to cause the first automation system to replace a first hardware component corresponding to the first component type with a second hardware component corresponding to a second component type, and wherein the first component type is different from the second component type.

10. The server of claim 9, wherein the first automation system is a programmable logic controller (PLC) that is coupled to a third hardware component and a fourth hardware component corresponding to the first component type.

11. The server of claim 9, wherein the first automation system is a supervisory control and data acquisition (SCADA) systems and the first hardware component comprises a first remote terminal unit that comprises a first microprocessor, wherein the command causes the first automation system to replace the first remote terminal unit with a second remote terminal unit that comprises a second microprocessor, and wherein the second remote terminal unit has a lower failure rate than the first remote terminal unit.

12. The server of claim 9, wherein the memory further comprises functionality for:

obtaining failure rate data and obsolete component data regarding a second automation system among the plurality of automation systems;

determining whether to extend a usage date of the second automation system based on whether the failure rate data and the obsolete component data satisfy a predetermined extension criterion; and transmitting, in response to the failure rate data and the obsolete component data failing to satisfy the predetermined extension criterion, a command to cause the second automation system to be replaced by a third automation system.

13. The server of claim 12, wherein the predetermined extension criterion corresponds to a predetermined number of obsolete component types that are used by the second automation system and a failure rate threshold.

14. The server of claim 9, wherein the memory further comprises functionality for:

obtaining, from a second automation system, a request to perform a first lifecycle analysis on the second automation system;

obtaining, from a plurality of vendor servers, obsolete component data regarding the second automation system;

determining whether to extend a usage date of the second automation system based on the obsolete component data; and assigning, in response to determining that that the obsolete component data satisfies a predetermined extension criterion, a predetermined date for performing a second lifecycle analysis on the second automation system.

15. The server of claim 9, wherein the memory further comprises functionality for:

transmitting, to a user device in real-time, a report regarding the plurality of automation systems, wherein the report is presented in the user device using a graphical user interface that describes a consumption of replacement components by the plurality of automation systems.

16. A non-transitory computer readable medium storing instructions executable by a computer processor, the instructions comprising functionality for:

obtaining, from a plurality of replacement requests for a plurality of hardware components, replacement data regarding the plurality of hardware components from a plurality of automation systems, wherein the plurality of replacement requests are transmitted by the plurality of automation systems over a network to a remote server, and wherein the replacement data describe component replacements for a plurality of component types that are used by the plurality of automation systems and include purchase order information for the plurality of hardware components;

determining a failure rate of a first component type using the replacement data without accessing a database remote from the non-transitory computer readable medium, wherein the first component type is associated with at least one automation system among the plurality of automation systems;

determining whether the failure rate of the first component type satisfies a predetermined replacement criterion;

determining, by the remote server, whether the automation system satisfies an expedited replacement criterion; and transmitting, in response to determining that the failure rate of the first component type fails to satisfy the predetermined replacement criterion and determining whether the automation system satisfies the expedited replacement criterion, a command to a first automation system among the plurality of automation systems by a predetermined time or an earlier time than the predetermined time, wherein the command is configured to cause the first automation system to replace at least one hardware component corresponding to the first component type with one or more hardware components corresponding to a second component type, and wherein the first component type is different from the second component type.

17. The non-transitory computer readable medium of claim 16, wherein the instructions further comprise functionality for:

obtaining failure rate data and obsolete component data regarding a second automation system among the plurality of automation systems;

determining whether to extend a usage date of the second automation system based on whether the failure rate data and the obsolete component data satisfy a predetermined extension criterion; and transmitting, in response to the failure rate data and the obsolete component data failing to satisfy the predetermined extension criterion, a command to cause the second automation system to be replaced by a third automation system.

18. The non-transitory computer readable medium of claim 17, wherein the predetermined extension criterion corresponds to a predetermined number of obsolete component types that are used by the second automation system and a failure rate threshold.

19. The non-transitory computer readable medium of claim 16, wherein the instructions further comprise functionality for:
obtaining a request to perform a first lifecycle analysis on a second automation system;
determining whether to extend a usage date of the second automation system based on obsolete component data regarding the second automation system; and
assigning, in response to determining that that the obsolete component data satisfies a predetermined extension criterion, a predetermined date for performing a second lifecycle analysis on the second automation system.

20. The non-transitory computer readable medium of claim 16, wherein the predetermined replacement criterion corresponds to a predetermined number of component failures over a predetermined amount of time.

* * * * *